United States Patent
Dalibard et al.

(10) Patent No.: US 11,014,247 B2
(45) Date of Patent: May 25, 2021

(54) MOBILE ROBOT WITH ENHANCED BALANCED MOTION AND BEHAVIOR CAPABILITIES

(71) Applicant: SOFTBANK ROBOTICS EUROPE, Paris (FR)

(72) Inventors: Sébastien Dalibard, Paris (FR); Justine Lanca, Paris (FR); Jory Lafaye, Paris (FR)

(73) Assignee: SOFTBANK ROBOTICS EUROPE, Paris (FR)

( * ) Notice: Subject to any disclaimer, the term of this patent is extended or adjusted under 35 U.S.C. 154(b) by 305 days.

(21) Appl. No.: 16/097,124

(22) PCT Filed: Apr. 29, 2016

(86) PCT No.: PCT/IB2016/052452
§ 371 (c)(1),
(2) Date: Oct. 26, 2018

(87) PCT Pub. No.: WO2017/187235
PCT Pub. Date: Nov. 2, 2017

(65) Prior Publication Data
US 2019/0118384 A1 Apr. 25, 2019

(51) Int. Cl.
*B25J 11/00* (2006.01)
*B25J 9/16* (2006.01)
(Continued)

(52) U.S. Cl.
CPC .......... *B25J 11/0035* (2013.01); *B25J 9/162* (2013.01); *B25J 9/1628* (2013.01); *B25J 9/1664* (2013.01);
(Continued)

(58) Field of Classification Search
CPC ............................ B25J 9/1605; B62D 57/032
See application file for complete search history.

(56) References Cited

U.S. PATENT DOCUMENTS

| 6,915,230 B2 * | 7/2005 | Kawai | A61B 5/1038 |
| | | | 702/127 |
| 2009/0208094 A1 * | 8/2009 | Hattori | G06K 9/00664 |
| | | | 382/153 |

(Continued)

FOREIGN PATENT DOCUMENTS

| EP | 2 933 065 A1 | 10/2015 |
| EP | 2 933 068 A1 | 10/2015 |

(Continued)

OTHER PUBLICATIONS

Kajita, et al. "Biped walking pattern generation by using preview control of zero-moment point", Robotics and Automation, 2003, Proceedings, ICRA'03, IEEE International Conference on. vol. 2. IEEE, 2003.

(Continued)

*Primary Examiner* — Bhavesh V Amin
(74) *Attorney, Agent, or Firm* — BakerHostetler

(57) ABSTRACT

A mobile robot is provided to follow a trajectory and adopt a behavior which can be defined by movements of articulated limbs of the robot. The mobile robot is equipped with a processor which is configured, based on instructions defining a motion of the mobile robot and instructions defining a behavior of the mobile robot, to calculate a target trajectory of a center of mass of the mobile robot; calculate, based on the target trajectory of the center of mass of the mobile robot and dynamic constraints of the mobile robot, a predicted trajectory of the center of mass of the mobile robot over a time horizon, and calculate, based on the predicted trajectory of the center of mass of the mobile robot and the instructions defining a behavior of the mobile robot, predicted movements of articulated limbs.

12 Claims, 10 Drawing Sheets

(51) Int. Cl.
  *B25J 19/00* (2006.01)
  *G05D 1/00* (2006.01)
  *G05D 1/08* (2006.01)

(52) U.S. Cl.
  CPC ........ *B25J 19/0008* (2013.01); *G05D 1/0011* (2013.01); *G05D 1/0891* (2013.01)

(56) References Cited

U.S. PATENT DOCUMENTS

| | | | | |
|---|---|---|---|---|
| 2010/0057253 | A1* | 3/2010 | Kwon | B25J 19/0091 700/245 |
| 2011/0172817 | A1* | 7/2011 | Park | B62D 57/032 700/245 |
| 2011/0172824 | A1* | 7/2011 | Park | B62D 57/032 700/261 |
| 2011/0172825 | A1* | 7/2011 | Lee | B25J 9/161 700/261 |
| 2011/0178637 | A1* | 7/2011 | Lee | B62D 57/032 700/254 |
| 2012/0143376 | A1* | 6/2012 | Seo | B25J 9/104 700/261 |
| 2012/0158175 | A1* | 6/2012 | Lee | B25J 9/162 700/246 |
| 2012/0158181 | A1* | 6/2012 | Seo | G05B 15/00 700/261 |
| 2012/0158182 | A1* | 6/2012 | Lee | B25J 9/162 700/261 |
| 2012/0158183 | A1* | 6/2012 | Lim | B25J 9/162 700/261 |
| 2012/0165987 | A1* | 6/2012 | Kim | G05D 1/0891 700/261 |
| 2012/0310412 | A1* | 12/2012 | Seo | B25J 9/0006 700/254 |
| 2013/0116820 | A1* | 5/2013 | Lee | B62D 57/032 700/254 |
| 2013/0144439 | A1* | 6/2013 | Lee | B25J 9/1633 700/261 |
| 2015/0231786 | A1* | 8/2015 | Doi | B25J 9/1605 700/245 |
| 2018/0107175 | A1* | 4/2018 | Ha | B25J 9/1656 |

FOREIGN PATENT DOCUMENTS

| | | |
|---|---|---|
| EP | 2 952 993 A1 | 12/2015 |
| JP | 2011-161524 A | 8/2011 |
| JP | 2015-150678 A | 8/2015 |
| WO | 2009/124955 A2 | 10/2009 |

OTHER PUBLICATIONS

Ramos, et al., "Dynamic whole body motion generation for the dance of a humanoid robot", IEEE Robotics & Automation Magazine (RAM) (2015).

Lafaye, et al., Linear Model Predictive Control of the Locomotion of Pepper, a humanoid robot with omnidirectional wheels, 2014 14th IEEE-RAS International Conference on Humanoid Robots (Humanoids), Nov. 18-20, 2014, Madrid, Spain.

Lafaye, "Commande des mouvements et de l'équilibre d'un robot humanoïde à roues omnidirectionnelles" (Doctoral dissertation, Université Grenoble Alpes), (2015).

\* cited by examiner

MOBILE ROBOT WITH ENHANCED BALANCED MOTION AND BEHAVIOR CAPABILITIES

CROSS-REFERENCE TO RELATED APPLICATIONS

This application is a National Stage of International patent application PCT/IB2016/052452, filed on Apr. 29, 2016, the disclosures of which is incorporated by reference in its entirety.

FIELD OF THE INVENTION

The present invention relates to the field of robotics. More specifically, it relates to the execution, by a mobile robot, of complex motions comprising a combination of a displacement and movements of articulated limbs.

BACKGROUND PRIOR ART

A robot can be qualified as humanoid from the moment when it has certain human appearance attributes: a head, a trunk, two arms, two hands, etc. A humanoid robot may, however, be more or less sophisticated. Its limbs may have a greater or lesser number of articulations. It may control its own balance statically and/or dynamically and walk on two limbs, possibly in three dimensions, or roll over a base. It may pick up signals from the environment ("hear", "see", "touch", "sense", etc.) and react according to more or less sophisticated behaviors, and interact with other robots or humans, either by speech or by gesture. Even if the issues of balance and displacement arise more specifically for humanoid robots, they more generally arise for mobile robots which may have a semi-humanoid appearance, pet robots, or mobile industrial robots.

The movement of a mobile robot is managed by sending commands to actuators of the articulations of the robot. It is possible to assign to the robot a desired behavior while maintaining the balance of the robot, using inverse dynamics. Kajita, Shuuji, et al. "*Biped walking pattern generation by using preview control of zero-moment point.*" Robotics and Automation, 2003. Proceedings. ICRA'03. IEEE International Conference on. Vol. 2. IEEE, 2003 discloses a method to make a biped humanoid robot follow a trajectory without falling, by controlling the Zero-Moment Point. The Zero-Moment Point (ZMP) is a virtual point whose position depends on the acceleration and gravity of the robot, and corresponds to the point where the total of horizontal inertia and gravity forces equals 0. In order for a robot to remain balanced, this ZMP should remain in a stability region. The dynamics model of the biped robot disclosed by Kajita makes the ZMP as well as the Center Of Mass (CoM) of the robot remain in stability regions, thus permitting the robot to walk along a trajectory without a risk of falling.

In Kajita, all commands sent to the robot are aimed at making the robot walk while keeping its equilibrium. Thus, natural balance of the CoM or ZMP due to the walk of the robot can be compensated by movements of other articulated limbs of the robot. For example, the positions and accelerations of the arms of the robot can be used to compensate an excessive movement of the ZMP or the CoM of the robot.

Meanwhile, in a number of applications, it is desirable to cause the robot to execute movements of articulated limbs, for example to define an interaction. Such movements of articulated limbs may define for example a dance or choreography, or may correspond to a human behavior, such as shaking a hand. The combination of such movements of the articulations with the displacement of the feet of the robot can cause the ZMP or CoM of the robot to leave its safety region, and thus the robot to fall.

It is possible to determine commands of all the articulations of a robot to perform movements as close as possible to dance movements, while following a trajectory. It is notably possible to use inverse dynamics to assign to each articulation of a robot the commands to perform movements as close as possible to target movements. However, when the robot has a high number of articulations, the inverse dynamics has a high number of degrees of freedom, and this solution becomes very computationally intensive. This is the case of most modern robots, with lots of articulations in the legs, arms, etc. . . . . . In this case, the inverse dynamics are too complex to calculate in real time on the limited computing resources onboard a robot.

Ramos, O., et al. "Dynamic whole body motion generation for the dance of a humanoid robot." *IEEE Robotics & Automation Magazine (RAM)* (2015) discloses a method for making a robot reproduce dance movements. In order to have a faster computation of the trajectories, Ramos discloses a separate calculation of the commands to generate the motion of the robot, using Inverse Dynamics, and the commands for dance movements, using Inverse Kinematics, the generation of these commands running in parallel in tasks on a Stack of Tasks.

In Ramos, the Inverse Dynamics are used to dynamically calculate commands to be sent to track the trajectory of the human performer, as well as the resulting predicted trajectory of the CoM of the robot. In parallel, the Inverse Kinematics are used to calculate commands to be used to make the robot perform dance movements as close as possible to the dance movements of the dancer, while maintaining the balance of the robot. This method has the advantage of allowing the robot, at the same time, to follow a trajectory and perform dance movement. Indeed, the Inverse Dynamics are performed on a limited number of degrees of freedom, and thus are not too computationally intensive.

However, once the trajectory of the CoM of the robot has been calculated by the inverse dynamics, the method of Ramos is limited for following the dance movements. Indeed, when calculating the movements of the other limbs using inverse dynamics, the method disclosed by Ramos must maintain the balance of the robot, especially the position of the CoM and ZMP. Thus, many movements of the articulated limbs of the robot are impossible to perform, because they would unbalance the robot, and make it fall. Thus, the method of Ramos allows only a limited imitation of the dance movements of the dancer.

There is therefore the need of a robot which is able to compute in real time the commands which allow it at the same time to follow a trajectory, and perform expressive movements of the articulated limbs which are part of a behavior. This issue is not restricted to dance performance, but also arises when trying to perform movements such as shaking a hand or managing an unexpected event, for example for avoiding an obstacle with an arm or the torso, while following a trajectory with the base of the robot.

SUMMARY OF THE INVENTION

To this effect, the invention discloses a mobile robot having a plurality of articulated limbs; a processor configured to: receive as input instructions defining a motion of the mobile robot and instructions defining a behavior of the mobile robot; calculate a target trajectory of a center of mass of the mobile robot based on the input; calculate, based on the target trajectory of the center of mass of the mobile robot and dynamic constraints of the mobile robot, a predicted trajectory of the center of mass of the mobile robot over a time horizon; calculate, based on the predicted trajectory of the center of mass of the mobile robot and the instructions defining a behavior of the mobile robot, predicted movements of articulated limbs.

Advantageously, the processor is configured to calculate the target trajectory of the center of mass of the mobile robot by calculating, at successive time steps: positions of centers of mass of the articulated limbs of the mobile robot; positions of the center of mass of the mobile robot, based on a target position of the mobile robot, the masses and the positions of the centers of mass of the articulated limbs of the mobile robot.

Advantageously, the processor is configured to calculate the predicted trajectory of the center of mass of the mobile robot using a dynamic model of the mobile robot.

Advantageously, the processor is configured to calculate the predicted trajectory of the center of mass of the mobile robot, by: modeling the mobile robot as a double inverted pendulum comprising two masses which are respectively a center of mass of a base of the mobile robot and a center of mass of an upper body of the robot; formulating constraints that the Zero Moment Point of the mobile robot never leaves a polygon having a position defined relative to the base of the mobile robot, and the base of the mobile robot has a maximum acceleration and speed; solving the problem of control of the double inverted pendulum, in order to minimize a function of cost, said function of cost being based on at least one of differences of positions of the center of mass of the mobile robot in the target trajectory and positions of the center of mass of the mobile robot in the predicted trajectory, and speeds of the center of mass of the mobile robot in the target trajectory and speeds of the center of mass of the mobile robot in the predicted trajectory.

Advantageously, the processor is configured to calculate predicted movements of articulated limbs with respect to dynamic constraints of the mobile robot in order to minimize a function of cost.

Advantageously, the function of cost is a weighted average, at successive time steps, of at least two of a distance between predicted positions of the center of mass of the mobile robot, differences between target speeds of articulated limbs and predicted speeds of articulated limbs and distances between target positions of articulated limbs and predicted positions of articulated limbs.

Advantageously, the processor is configured to calculate predicted movements of articulated limbs under the constraints limits of joint angles, joint velocity and joint accelerations.

Advantageously, the instructions defining a behavior of the mobile robot are defined by at least one timed posture to reach, and the processor is further configured to convert said at least one timed posture of the mobile robot into target trajectories of articulated limbs relative to the mobile robot.

Advantageously, the predicted trajectory of the center of mass of the mobile robot is defined by values of predicted positions and speeds of the center of mass of the mobile robot at successive time steps over a time window.

Advantageously, the predicted movements of articulated limbs are defined by values of one or more of angles between articulated limbs, and angular velocities between articulated limbs at said successive time steps, said values of one or more of angles between articulated limbs, and angular velocities between articulated limbs at said successive time steps to be converted into setpoint command of motors.

Advantageously, the predefined time step is 20 ms, and the time window has a duration of 1.6 s.

Advantageously, the instructions defining a motion of the mobile robot, and the instructions defining the behavior of the mobile robot are defined by a user on the user interface.

Advantageously, the instructions defining a motion of the mobile robot correspond to a predefined trajectory, and the processor is configured to calculate instructions defining the behavior of the mobile robot upon the occurrence of an unexpected event.

The invention also discloses a user interface to define motions and behaviors of a mobile robot having a plurality of articulated limbs, said user interface comprising computer code instructions to: let the user define as input instructions defining a motion of the mobile robot and instructions defining a behavior of the mobile robot; calculate a target trajectory of the center of mass of the mobile robot based on the input; calculate, based on the target trajectory of the center of mass of the mobile robot and dynamic constraints of the mobile robot, a predicted trajectory of the center of mass of the mobile robot over a time horizon; calculate, based on the predicted trajectory of the center of mass of the mobile robot and the instructions defining a behavior of the mobile robot, predicted movements of articulated limbs.

The invention also discloses a method to calculate predicted movements of a mobile robot having a plurality of articulated limbs, said method comprising: receiving as input instructions defining a motion of the mobile robot and instructions defining a behavior of the mobile robot;

calculating a target trajectory of the center of mass of the mobile robot based on the input; calculating, based on the target trajectory of the center of mass of the mobile robot and dynamic constraints of the mobile robot, a predicted trajectory of the center of mass of the mobile robot over a time horizon; calculating, based on the predicted trajectory of the center of mass of the mobile robot and the instructions defining a behavior of the mobile robot, predicted movements of articulated limbs.

The invention allows a mobile robot to follow a target trajectory and execute a behavior without becoming unbalanced.

The invention allows a mobile robot to follow closely target trajectories of articulated limbs without becoming unbalanced, even if the mobile robot has a low number of degrees of freedoms, or if target trajectories of articulated limbs are heavily constrained.

The invention allows a user to define behaviors of mobile robots more freely.

The invention allows a user to define movements that can be performed by the robot, which would not have been performed in the prior art.

The invention can be embedded on a mobile robot with limited computing complexity.

The invention allows, when the robot is following a trajectory, to adapt the behavior of the robot in real time, in order to take into account unexpected constraints or interactions, for example in order to avoid unexpected obstacles, or to adopt a behavior when seeing a human or a robot with which an interaction is possible.

The invention can be implemented within a robot by a simple update of the firmware of the robot.

BRIEF DESCRIPTION OF THE DRAWINGS

The invention will be better understood and its various features and advantages will emerge from the following description of a number of exemplary embodiments and its appended figures in which.

DETAILED DESCRIPTION OF THE INVENTION

Figure 1:
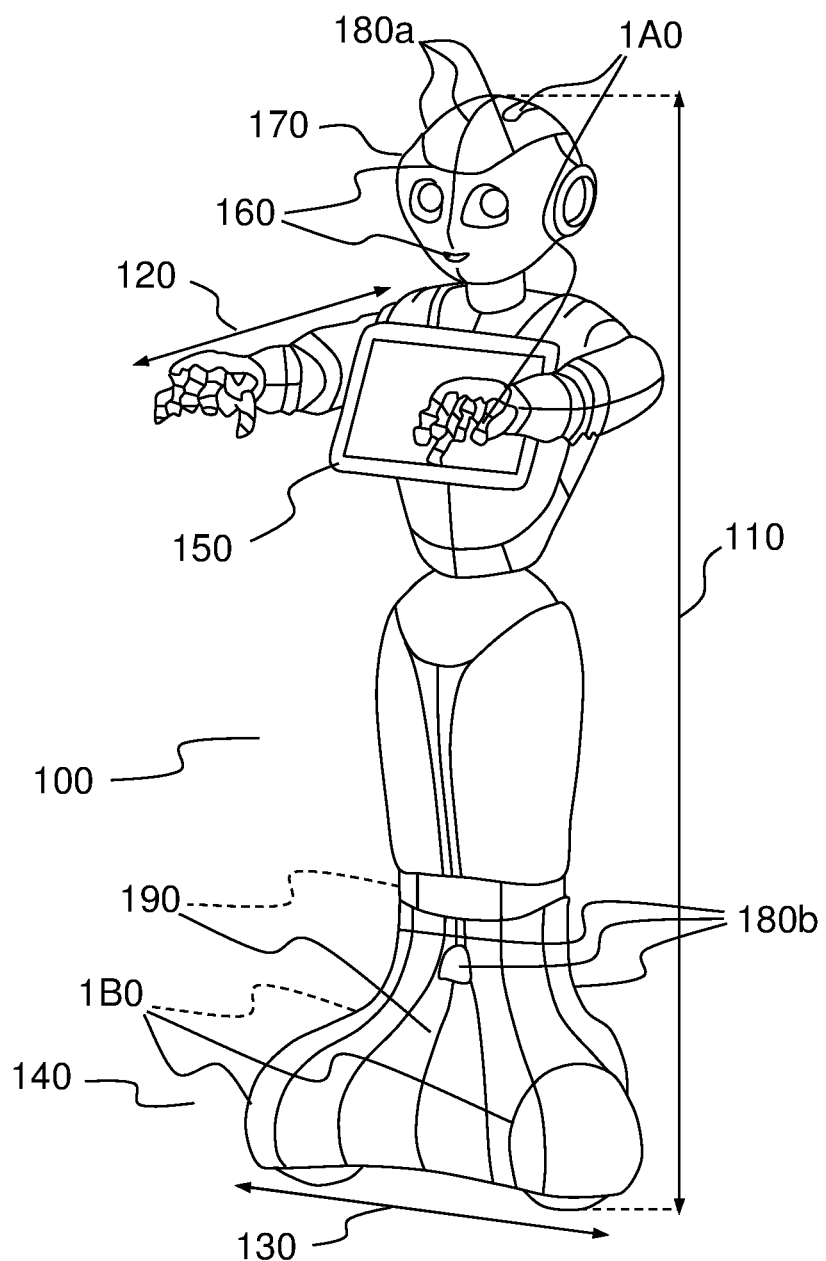
FIG. 1 displays a physical architecture of a mobile robot in a number of embodiments of the invention.

FIG. 1 displays a physical architecture of a humanoid robot in a number of embodiments of the invention.

The specific robot 100 on the figure is taken as an example only of a humanoid robot in which the invention can be implemented. The lower limb of the robot on the figure is not functional for walking, but can move in any direction on its base 140 which rolls on the surface on which it lays. The invention can be easily implemented in a robot which is fit for walking. By way of example, this robot has a height 110 which can be around 120 cm, a depth 120 around 65 cm and a width 130 around 40 cm. In a specific embodiment, the robot of the invention has a tablet 150 with which it can communicate messages (audio, video, web pages) to its environment, or receive entries from users through the tactile interface of the tablet. In addition to the processor of the tablet, the robot of the invention also uses the processor of its own motherboard, which can for example be an ATOM™ Z530 from Intel™. The robot of the invention also advantageously includes a processor which is dedicated to the handling of the data flows between the motherboard and, notably, the boards bearing the Magnetic Rotary Encoders (MREs) and sensors which control the motors of the joints in a limb and the balls that the robot uses as wheels, in a specific embodiment of the invention. The motors can be of different types, depending on the magnitude of the maximum torque which is needed for a definite joint. For instance, brush DC coreless motors from e-Minebea™ (SE24P2CTCA for instance) can be used, or brushless DC motors from Maxon™ (EC45_70W for instance). The MREs are preferably of a type using the Hall effect, with 12 or 14 bits precision.

In embodiments of the invention, the robot displayed on FIG. 1 also comprises various kinds of sensors. Some of them are used to control the position and movements of the robot. This is the case, for instance, of an inertial unit, located in the torso of the robot, comprising a 3-axes gyroscope and a 3-axes accelerometer. The robot can also include two 2D color RGB cameras 160 on the forehead of the robot (top and bottom) of the System On Chip (SOC) type, such as those from Shenzen V-Vision Technology Ltd™ (OV5640), with a 5 megapixels resolution at 5 frames per second and a field of view (FOV) of about 57° horizontal and 44° vertical. One 3D sensor 170 can also be included behind the eyes of the robot, such as an ASUS XTION™ SOC sensor with a resolution of 0.3 megapixels at 20 frames per second, with about the same FOV as the 2D cameras. The robot of the invention can also be equipped with laser lines generators, for instance three in the head 180*a* and three in the base 180*b*, so as to be able to sense its relative position to objects/beings in its environment. In other embodiments of the invention, the robot only has laser lines generators in the base. The robot of the invention can also include microphones to be capable of sensing sounds in its environment. In an embodiment, four microphones with a sensitivity of 300 mV/Pa+/−3 dB at 1 kHz and a frequency range of 300 Hz to 12 kHz (−10 dB relative to 1 kHz) can be implanted on the head of the robot. The robot of the invention can also include two sonar sensors 190, possibly located at the front and the back of its base, to measure the distance to objects/human beings in its environment.

The robot can also include tactile sensors 1A0, on its head and on its hands, to allow interaction with human beings. It can also include bumpers 1B0 on its base to sense obstacles it encounters on its route.

The robot can also sense contact of its upper members with objects that they touch by calculating a difference between a planned trajectory and an actual trajectory. A method to this effect is disclosed by European patent application filed the same day by the same applicant under n° EP14305848.5.

To translate its emotions and communicate with human beings in its environment, the robot of the invention can also include:
- LEDs, for instance in its eyes, ears and on its shoulders;
- Loudspeakers, for instance two, located in its ears.

The robot of the invention may communicate with a base station or other robots through an Ethernet RJ45 or a WiFi 802.11 connection.

The robot of the invention can be powered by a Lithium Iron Phosphate battery with an energy of about 400 Wh. The robot can access a charging station fit for the type of battery that it includes.

Position/movements of the robots are controlled by its motors, using algorithms which activate the chains defined by each limb and effectors defined at the end of each limb, in view of the measurements of the sensors.

From sensors 160, 170, 180, 190, 1A0 or 1B0, or from the result of an evaluation of a contact of its upper members with an object, the computing modules of the robot can compute a local map of the obstacles in its environment, as disclosed by European patent application filed under n° EP14305849.3.

Figure 2:
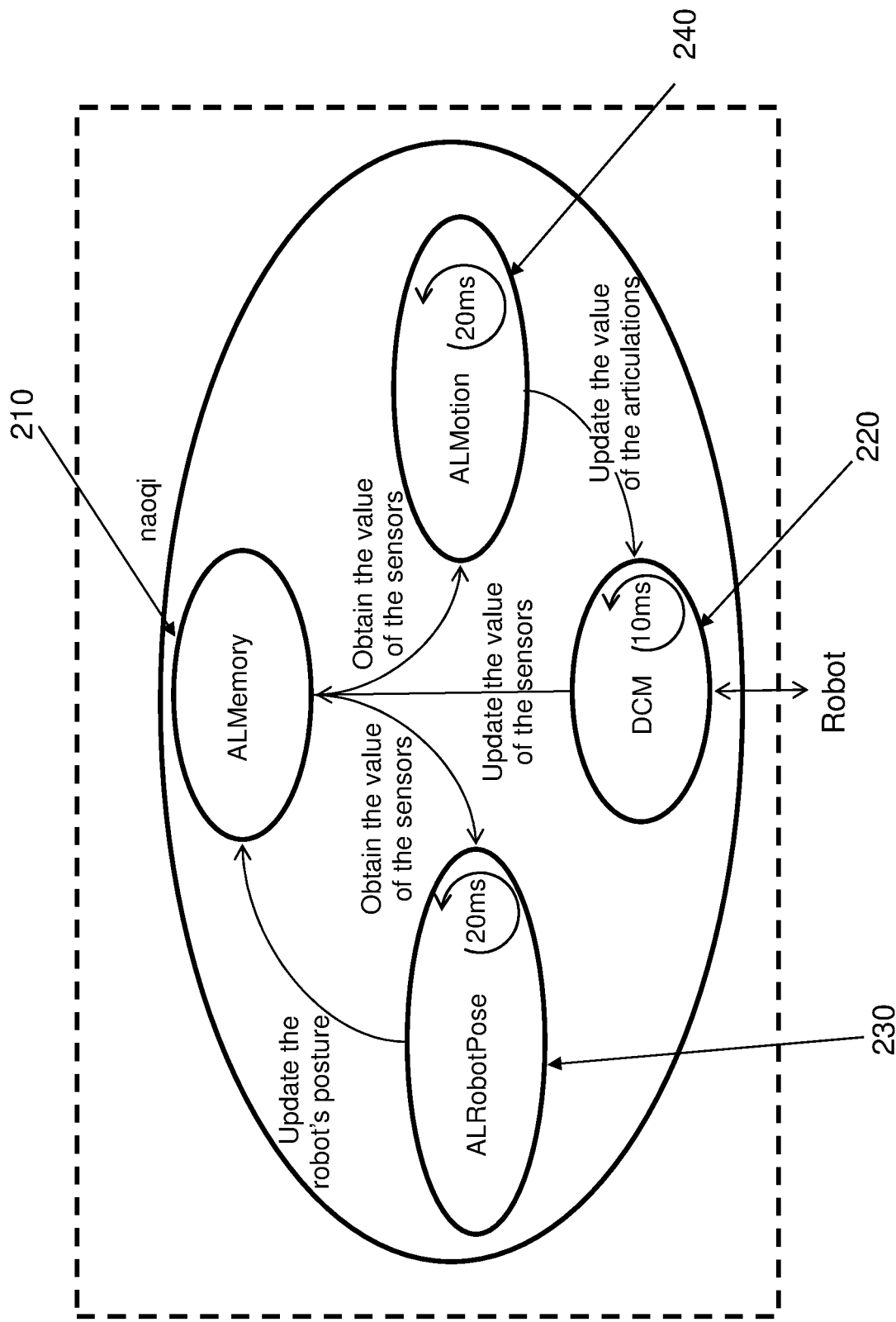
FIG. 2 displays a functional architecture of the software modules of the robot in a number of embodiments of the invention.

FIG. 2 displays a functional architecture of the software modules of the robot in a number of embodiments of the invention.

FIG. 2 is a diagram of a physical and functional architecture allowing the implementation of the invention in several of its embodiments. A robot of this type is advantageously endowed with high-level software allowing the piloting of the functions of the robot in an embodiment of the invention. A software architecture of this type, dubbed NAOQI, has been disclosed notably in patent application WO2009/124955 published on Oct. 10, 2009. It comprises the basic functions for managing the communications between a robot and a PC or a remote site and exchanging software which provides the software infrastructure necessary for the implementation of the present invention. Also, European patent application n° EP14305578.8 discloses an operating system designed to operate a robot with advanced interaction/dialog capabilities.

NAOQI is a framework optimized for robotic applications; it supports several languages, notably C++, Python and Urbi. Within the context of the present invention, the following modules of NAOQI are particularly useful:

- the module ALMemory, 210, manages a memory shared between the various modules of NAOQI;
- the module DCM, 220, manages the communications with the physical robot (motors, sensors);
- the module ALRobotPose, 230, computes the current posture of the robot by comparing with the reference postures;
- the ALMotion module, 240, manages the robot's movements.

These four modules are advantageously coded in C++. The figure also indicates the data flows between modules. In particular, the inputs necessary for the implementation of the Fall avoidance and collision avoidance functions are:

- The values of the sensors (cameras, laser lines generators, sonars, tactile sensor, for example);
- The robot's posture.

In the case of detecting a possible collision, the specific functions designed to implement the instant invention dispatch commands for updating the trajectory of the robot.

Also indicated in the figure, purely by way of illustration, are values of the refresh cycles for the data processed by each module: 20 ms for the updating of the robot's posture and the fall management data; 10 ms for the values of some of the sensors. A map of the obstacles in the environment of the robot can be refreshed every 100 ms, which is the typical cycle time for processing images acquired by a 3D camera, by way of example, only.

Figure 3:
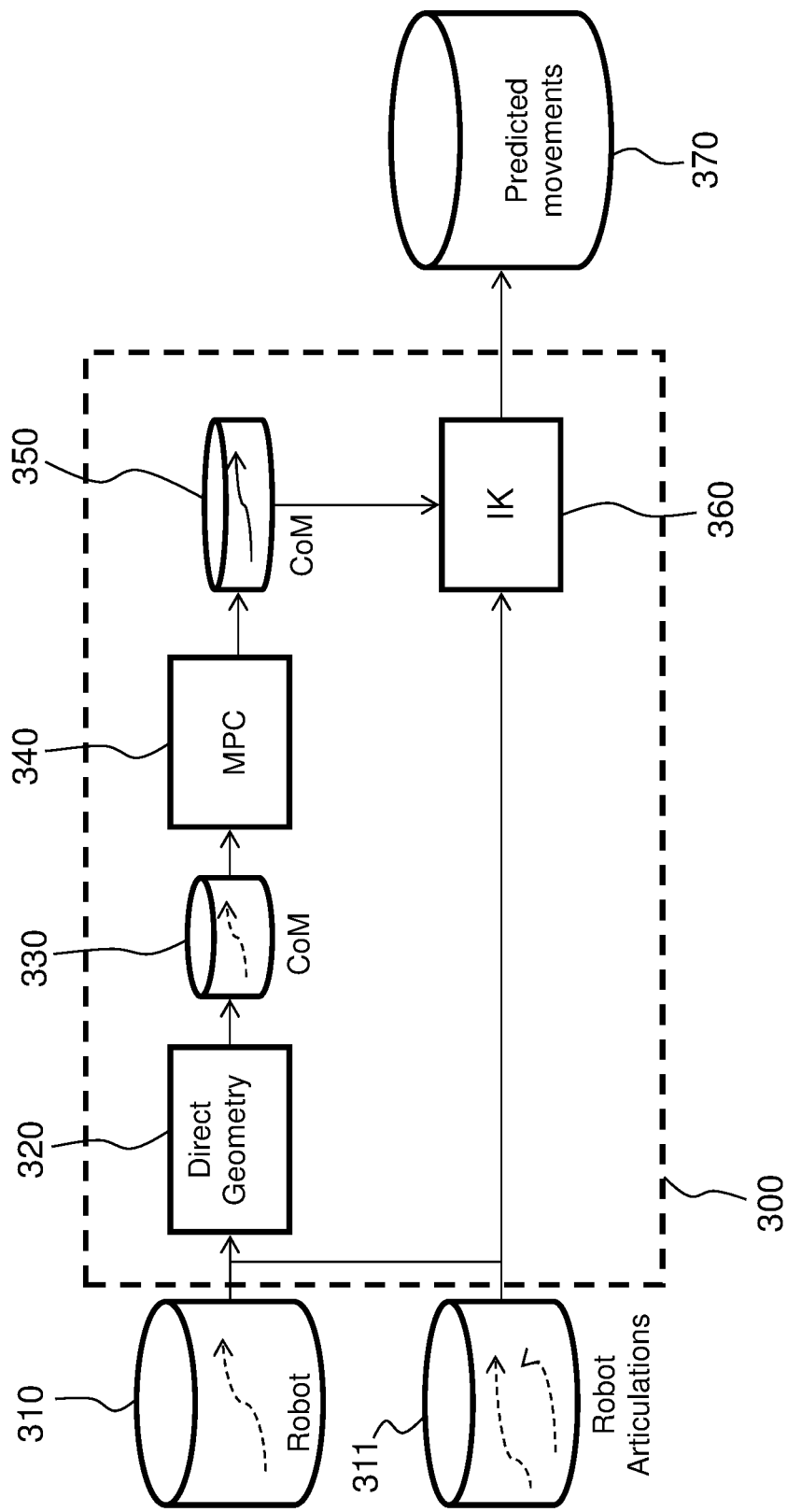
FIG. 3 displays an architecture of the software modules for calculating a trajectory of the Center of Mass and angular velocities of articulations of a robot according to the invention.

FIG. 3 displays an architecture of the software modules for calculating a trajectory of the Center of Mass and angular velocities of articulations of a robot according to the invention.

The modules of this architecture 300 can be coded in C++, or in any language which is executable natively by a processor, for example the C language, any interpreted language that can be executed in a virtual machine, for example in Java, or any or any script language, for example in Python.

The robot of the invention has a processor which is configured, when loading software modules, for example the modules of the architecture 300, to calculate a predicted trajectory of the center of mass (CoM) of the robot, and predicted movements of articulated limbs.

A processor which is configured for executing the software modules of the architecture 300 receives as input instructions 310 defining a motion of the mobile robot, and instructions 311 defining a behavior of the mobile robot.

In preferred embodiments of the invention, instructions 310 defining the motion of the mobile robot are a target trajectory of the mobile robot. The instructions 310 can for example be defined by successive positions of the mobile robot, at successive time steps and over a time window. When the robot is a wheeled robot, such as the robot displayed in FIG. 1, the instructions can correspond to successive positions of the base of the mobile robot. In a number of embodiments of the inventions, instructions 310 refer to positions of a predefined point of the robot, or a frame rigidly attached to the body of the robot.

A number of different embodiments are possible for determining the point to which instructions 310 apply. In embodiments wherein the robot is a wheeled robot, instructions 310 can for example define successive positions of the center of mass of the base of the mobile robot. In embodiments wherein the robot is a walking robot, the instructions 310 can for example define successive positions of a point in the center of the feet of the robot.

According to various embodiments of the invention, instructions 311 defining the behavior of the mobile robot may be expressed in different ways. For example, it may contain, at successive time steps, the angular values and angular speeds of all articulations of joints of the robot. Instructions 311 defining the behavior of the robot may also comprise one or more timed posture to reach. It is for example the case if the robot is instructed to shake a hand, instructions 311 defining the behavior of the robot contain a description of the posture of the robot when shaking the hand at a time t, and the processor has greater freedom to determine the most efficient way to attain the position, while remaining under the kinematic and mechanical constraints of the robot.

In a number of embodiments of the invention, the instructions 311 defining the behavior of the mobile robot are pre-calculated. It is for example the case if the behavior of the robot is planned in advance. It is for example the case if the robot executes dance choreography, which has been prepared in advance. In other embodiments of the invention, the instructions 311 defining the behavior of the mobile robot are calculated on-the-fly. It is for example the case if the robot determines a behavior to adopt in real time, based on inputs from sensors. For example, the robot can determine, when seeing a human being, to advance and shake a hand, generate a target posture to reach and a trajectory to follow to shake the hand of the human being. In another scenario, the robot can follow a trajectory. Then an unexpected obstacle appears on the trajectory, that the robot can avoid. It then generates on-the-fly a timed posture to reach in order to avoid the obstacle, and calculate, based on the target trajectory and the timed posture to reach to avoid the obstacle, predicted movements of articulated limbs.

The architecture 300 comprises a software module 320 to calculate a target trajectory 330 of a center of mass of the mobile robot based on the input. When loading and executing the software module 320, the processor of the robot is configured to calculate a target trajectory of the center of mass of the robot, based on the target trajectory of the robot and instructions defining the behavior of the mobile robot.

In a number of embodiments of the invention, if the instructions 310 defining the motion of the mobile robot are not a target trajectory of the robot formed by successive timed positions, the processor is configured to transform the instructions 310 defining a motion of the mobile robot into a target trajectory of the robot formed by successive timed positions.

Similarly, in a number of embodiments of the invention, the processor is configured, if the instructions 311 defining a behavior of the mobile robot are not target trajectories of the articulated limbs of the robot, to transform the instructions 311 defining a behavior of the mobile robot into target trajectories of the articulated limbs of the robot.

In a number of embodiments of the invention, the processor is configured to calculate, based on the target trajectory of the robot formed by successive timed positions and target trajectories of the articulated limbs of the robot, the target trajectory 330 of the center of mass of the robot. In a number of embodiments of the invention, the processor is configured to perform this calculation in a straightforward manner, by calculating, at successive time steps over a time window, positions of the center of mass of the robot based on positions of the robot, and positions and masses of articulated limbs of the robot, at successive time steps. This method advantageously allows calculating the target trajectory of the center of mass of the robot in a fast and straightforward way, using a limited computing power.

The architecture 300 further comprises a software module 340, and the processor is configured, when loading and executing the software module 340, to calculate, based on the target trajectory 330 of the center of mass of the mobile robot and dynamic constraints of the mobile robot, a predicted trajectory 350 of the center of mass of the mobile robot over a time horizon.

In a number of embodiments of the invention, the processor is configured, when loading the second module 340, to calculate the predicted trajectory of the center of mass of the robot using a dynamic model of the mobile robot. In a number of embodiments of the invention, the dynamic model is a linear model of predictive control of the mobile robot.

In a number of embodiments of the invention, the model is an inverted pendulum model. This is for example the case if the robot is a biped walking robot, the processor is then configured to:
  Model the mobile robot as an inverted pendulum comprising one mass is a center of mass of the robot;
  Solve a problem of control of the inverted pendulum, under the constraint that the Zero Moment Point of the mobile robot never leaves a polygon having a position defined relative to the robot.

In a number of embodiments of the invention, the mobile robot is a wheeled mobile robot, the model is a double inverted pendulum model, and the processor is configured to:
  Model the mobile robot as a double inverted pendulum comprising two masses which are respectively a center of mass of a base of the mobile robot and a center of mass of an upper part of the robot;
  Solve a problem of control of the double inverted pendulum, under the constraint that the Zero Moment Point of the mobile robot never leaves a polygon having a position defined relative to the mobile robot, and the base of the mobile robot has a maximum acceleration and speed.

An example of such linear model of predictive control is disclosed by J. Lafaye et al., *Linear Model Predictive Control of the Locomotion of Pepper, a humanoid robot with omnidirectional wheels*, 2014 14th IEEE-RAS International Conference on Humanoid Robots (Humanoids), Nov. 18-20, 2014. Madrid, Spain.

More specifically, in embodiments wherein the robot is a wheeled robot such as the robot displayed in FIG. 1, the processor can be configured to calculate the predicted trajectory of the center of mass of the robot using a two point-mass model, with b the position of the Center of Mass (CoM) of the mobile base, and c the position of the CoM of the upper body. The Newton and Euler equations for this two mass point model can be written:

$$m_b(\ddot{b}+g)+mc(\ddot{c}+g)=F \quad (1)$$

$$b*m_b(\ddot{b}+g)+c*m_c(\ddot{c}+g)=p*F \quad (2)$$

with F the contact force with the ground and p the corresponding Center of Pressure (CoP), $m_b$ and $m_c$ the masses of the mobile base and upper-body.

Under the assumption that the robot is moving on a horizontal ground, it is possible to simplify these equations under the following assumptions and conventions:

Associating the superscript x,y,z respectively for the two horizontal and the vertical axes;
The gravity vector is defined by: $g^x=g^y=0$; $g^z=g$;
If the robot moves on an horizontal ground, the height of the ZMP is constant $p^z=0$;
The height of the mobile base is constant: $b^z=l$;
Neglecting the effect of the vertical motion of the upper body, its height is also constant: $c^z=h$.

In other embodiments of the invention, the equations are adapted for non-horizontal ground, or for transitions between horizontal and non-horizontal grounds. In this specification, the control problem will be exemplified for a robot moving on a horizontal ground. However, a skilled man can adapt the calculation of the trajectory in other cases using known prior art methods. For example, Lafaye, J. (2015). *Commande des mouvements et de l'équilibre d'un robot humanoïde à roues omnidirectionnelles* (Doctoral dissertation, Université Grenoble Alpes) discloses the calculation of a trajectories of a wheeld robot similar to the robot disclosed in FIG. 1, using a double inverted pendulum, in more complex cases such as a robot moving on non-horizontal ground, cases when only two wheels are in contact with the ground, etc. . . . .

Under this assumption, Newton and Euler equations can be simplified to an equation which is linear with respect of the motion of the two point masses:

$$b^{xy}m_b g - lm_b \ddot{b}^{xy} + c^{xy}m_c g - hm_c \ddot{c}^{xy} = p^{xy}(m_b+m_c)g \quad (3)$$

The position of the ZMP can be obtained directly by equation (3):

$$p^{xy} = \frac{b^{xy}m_b g - lm_b \ddot{b}^{xy} + c^{xy}m_c g - hm_c \ddot{c}^{xy}}{(m_b+m_c)g} \quad (4)$$

Meanwhile, the position of the CoM of the robot can be obtained directly, based on the position $b^{xy}$ of the center of mass of the mobile base, the mass $m_b$ of the mobile base, the position $c^{xy}$ of the upper body and the mass $m_c$ of the upper body.

The position of the center of mass of the robot is thus defined, at any time, by:

$$a^{xy} = \frac{c^{xy}*m_c + b^{xy}*m_b}{m_c + m_b} \quad (5)$$

The predicted trajectory, defined as successive positions, of the CoM of the mobile base, the CoM of the upper body and the CoM of the robot are noted respectively $B^{xy}$, $C^{xy}$ and $A^{xy}$. The predicted trajectories, defined as successive pairs of positions and accelerations, of the mobile base, the CoM of the upper body and the CoM of the robot are noted respectively $(B^{xy}, \dot{B}^{xy})$, $(C^{xy}, \dot{C}^{xy})$ and $(A^{xy}, \dot{A}^{xy})$.

In a number of embodiments of the invention, in order to generate smooth motions of the robot, with smooth contact force profiles, the processor is configured to calculate the predicted trajectory of the CoM of the robot, under the assumption that the two point masses follow third order dynamics, with a sampling period T.

In a number of embodiments of the invention, the processor is configured to calculate the predicted trajectory 350 $(A^{xy}, \dot{A}^{xy})$ of the center of mass the mobile robot, in order to follow the target trajectory 330 $(A_{ref}^{xy}, \dot{A}_{ref}^{xy})$ of the center of mass of the mobile robot. In other embodiments of the invention, the predicted and target trajectories are defined solely by the predicted and target positions of the center of mass of the robot, respectively $A^{xy}$ and $A_{ref}^{xy}$, or solely by the predicted and target speeds of the center of mass of the robot, respectively $\dot{A}^{xy}$ and $\dot{A}_{ref}^{xy}$.

In a number of embodiments of the invention, the processor is configured to minimize a function of cost for the trajectory. For example, the processor can be configured to calculate the predicted trajectory 350 ($D^{xy}$, $\dot{D}^{xy}$) of the center of mass mobile robot, which minimizes:

$$O_1 = \tfrac{1}{2} \|\dot{A}^{xy} - \dot{A}_{ref}^{xy}\|^2 \qquad (6)$$

In other embodiments of the invention, the function of cost may depend on the positions of the center of mass of the robot, a weighted average of the differences between positions and speeds, using powers other than 2, etc. . . . . . Other examples of functions of cost may be:

$$O'_1 = \|A^{xy} - A_{ref}^{xy}\| \qquad (6')$$

$$O''_1 = \|A^{xy} - A_{ref}^{xy}\| + 2\|\dot{A}^{xy} - \dot{A}_{ref}^{xy}\|^2 \qquad (6'')$$

$$O'''_1 = 3x \|\dot{A}^{xy} - \dot{A}_{ref}^{xy}\|^3 \qquad (6''')$$

More generally, any function of cost whose cost increases with the distance of positions of the mobile robot with reference positions, the difference between speeds of the mobile robot and reference speeds, and/or derivative thereof can be used.

The minimization of the function of cost $O_1$ makes the CoM of the mobile robot follow the target trajectory as close as possible. In various embodiments of the invention, other functions of cost are possible, as soon as their minimization makes the robot follow a trajectory as close as possible to the target trajectory.

In a number of embodiments of the invention, the processor can be configured to minimize, in addition to a function of cost relative to the trajectory of the mobile robot, functions of cost which improve other characteristics of the trajectory, for example the robustness to perturbations, or the smoothness of the motion.

In order to ensure that the stability of the robot is respected, the processor is configured to calculate the predicted trajectory under a number of different constraints. One dynamic constraint consists in maintaining the ZMP within a support polygon, in order to avoid a fall of the robot.

Figure 4:
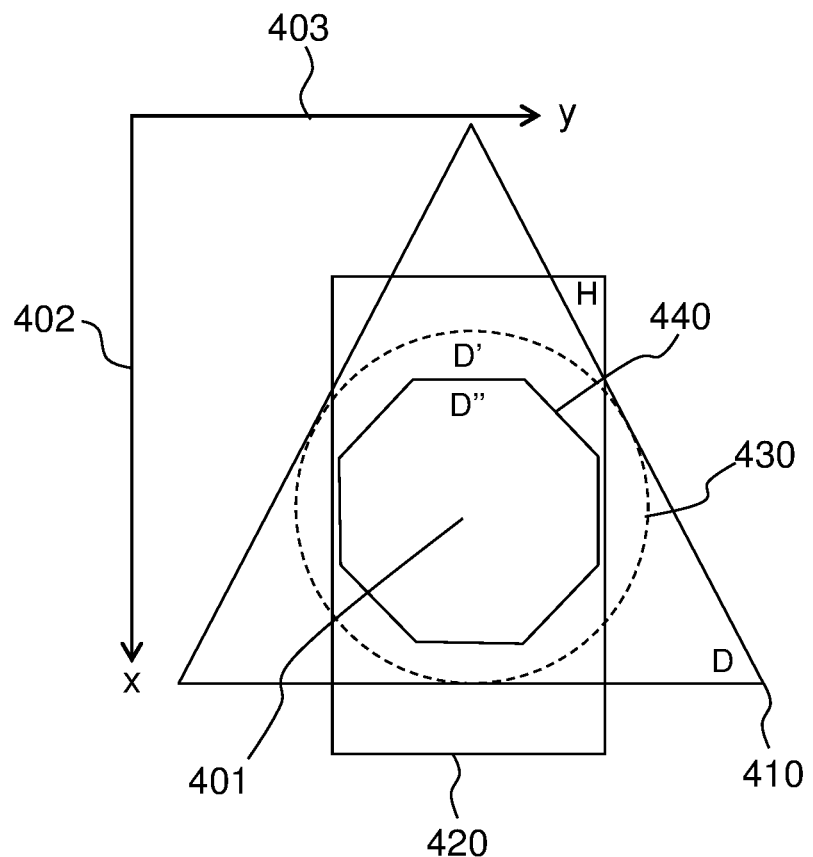
FIG. 4 displays examples of support polygon used for the formulation of dynamic constraints when calculating a predicted trajectory of the center of mass of the mobile robot in a number of embodiments of the invention.

FIG. 4 displays examples of a support polygon used for the formulation of dynamic constraints when calculating a predicted trajectory of the center of mass of the mobile robot in a number of embodiments of the invention.

FIG. 4 displays positions relative to the center of mass 401 of the base of the mobile robot, in a coordinate system (x,y) defined by axis 402 and 403. The support polygons 410, 430, 440, as well as the rectangle 420, have a position fixed with respect to the center of mass 401 of the base of the mobile robot, and their orientation vary with the orientation of the robot.

Dynamic balance of the motion imposes that the ZMP of the mobile robot, defined as $p^{xy}$ above, remains within a support polygon in order that the robot remains balanced. In a number of embodiments of the invention, the robot is a wheeled robot with a roughly triangular base, such as the robot displayed in FIG. 1. The support polygon can then be represented by a triangle D 410 centered on the robot, which represents the base of the robot.

In a number of embodiments of the invention, in order to keep the constraint invariant with respect with the orientation of the robot, the support polygon is a circle D' 430 inscribed in the support triangle. In yet other embodiments of the invention, in order to keep the constraint linear, the support polygon is an octagon D" 440, inscribed in the circle. The dimensions of the octagon D" 440 are calculated in order that any point within the octagon is also located inside the circle D' 430, and to have a good approximation of the circle. The use of a polygon advantageously allows to test if the ZMP remains within the circle, while computing only linear inequalities, which are much faster to calculate than the inclusion of a point within a circle. The octagon D" 440 is a good comprise between calculation complexity and the precision of the calculation.

More generally, the more the polygon has edges, the more precise but the more is the calculation. Thus, is possible to use a polygon with more edges, in order to have a better approximation of the circle. On the other hand, it is also possible to use a polygon with fewer edges, for example a square, in order to determine if the ZMP is in the circle, with an even reduced complexity.

The ZMP constraint can then be formalized as:

$$p^{xy} - B^{xy} \in D'' \qquad (7)$$

Wherein $P^{xy}$ represents the trajectory of the ZMP of the robot, with successive positions $p^{xy}$ of the ZMP, and $B^{xy}$ represents the predicted trajectory of the center of mass mobile robot, with successive positions $b^{xy}$ of the center of mass of the mobile robot.

In other embodiments of the invention, the support polygon may have different shapes and sizes. A skilled man would be able, without inventive skill, to define, for a given robot, the suitable support polygon.

Further constraints can be defined relative to the maximum velocity and acceleration of the center of mass of the robot, which can be defined for example by:

$$-\dot{b}_{max}^{xy} \leq \dot{B}^{xy} \leq \dot{b}_{max}^{xy} \qquad (8)$$

$$-\ddot{b}_{max}^{xy} \leq \ddot{B}^{xy} \leq \ddot{b}_{max}^{xy} \qquad (9)$$

In the equations (8) and (9), the values $\dot{b}_{max}^{xy}$ and $\ddot{b}_{max}^{xy}$ are respectively the maximum speed and acceleration of the mobile base of the robot. They can be predefined values, which are determined based on the mechanical capabilities of the robot. In other embodiments of the invention, the constraints of maximum speed and acceleration can be formulated on the center of mass of the whole mobile robot, with values $\dot{a}_{max}^{xy}$ and $\ddot{a}_{max}^{xy}$. In other embodiments of the invention, for example in embodiments wherein the robot is a biped robot, the maximum speed and acceleration can be defined according to the dynamic capabilities, for example the capabilities of walk of the mobile robot.

In a number of embodiments of the invention, the processor is also configured to formulate, based on the articulations of the robot, constraints on the relative positions of the center of mass of the upper body and the base of the robot. For example, based on the joint limits of the robot displayed in FIG. 1, it is possible to determine that the center of mass of the upper body stays within a rectangular zone H 420 around the center of mass of the base of the robot. Thus the constraint of maximum reach of the upper body can be formulated as:

$$-k^{xy} \leq C^{xy} - B^{xy} \leq k^{xy} \qquad (10)$$

The invention is not restricted to the examples above. For example, other simplifications or assumptions can be performed, for other types of robot, for example for a biped robot. The use of a dynamic model as disclosed above advantageously allows the robot to calculate a predicted trajectory of its center of mass which correctly takes into account the dynamic characteristics of the mobile robot, with a limited computing complexity.

In a number of embodiments of the invention, the dynamic model of the robot can also be very different. For example, it is possible to model the robot as a simple inverted pendulum, with a single point-mass representative of the center of mass of the robot, and formulate constraints on the maximum speed and acceleration on this point-mass.

Coming back to FIG. 3, the architecture 300 further comprises a software module 360, and the processor is configured, when loading and executing the software module 360, to calculate, based on the predicted trajectory 350 of the center of mass of the mobile robot and the instructions defining a behavior of the mobile robot 311, predicted movements 370 of articulated limbs.

Possible forms of instructions 311 defining the behavior of the mobile have been already discussed. In a number of embodiments of the invention, wherein the processor is configured to transform the instructions 311 defining the behavior of the mobile robot into target trajectories of the articulated limbs of the robot when executing the module 320, the target trajectories of the articulated limbs of the robot can be used instead of the input instructions 311 defining the behavior of the mobile robot.

In a number of embodiments of the invention, the processor is configured to calculate predicted movements 370 of articulated limbs using Generalized Inverse Kinematics. In a number of embodiments of the invention, this consists in calculating a vector Y defining at least target trajectories of the articulated limbs, in order to minimize a function of cost between vector Y and a reference vector $Y_{ref}$ with at least target trajectories of the articulated limbs. For example vector Y can be composed of:

Velocity of the torso of the robot;
Velocities of articulated joints.

In a number of embodiments of the invention, articulated joints which are not part of the kinematics chain, for example the articulated joints of the hand, are not taken into account. Articulated joints which are controlled by the same actuator can be mapped to a single variable within vector Y.

The processor is configured to formulate constraints on the Generalized Inverse Kinematics. In a number of embodiments of the invention, these constraints are:

The Joint limits, in terms of angles and/or velocities. This constraint is expressed by the following equation, defined by matrixes A and b:

$$AY+b=0 \quad (11)$$

The Balance of the robot. The CoM is constrained to follow exactly the trajectory output by the MPC. The trajectory of the CoM having been previously calculated with respect to a support polygon, making the center of mass of the robot follow this trajectory ensures that the robot remains balanced. This constraint is expressed by the following equation, defined by matrixes C and d:

$$CY+d\geq 0 \quad (12)$$

Other constraints are possible, as soon as they express the mechanical limits of the articulated joints, and the balance of the robot.

The processor can be configured to calculate the movements of articulated limbs by minimizing, under constraints such as those defined in (11) and (12), a function of cost between the vector Y and the reference vector $Y_{ref}$, for example:

$$\min \tfrac{1}{2}\|Y-Y_{ref}\|_Q^2 \quad (13)$$

wherein Q is the quadratic norm. In other embodiments of the invention, other functions of cost are possible, as soon as they allow the minimization of the speeds and positions of the articulated joints compared to the target movements of the articulated joints.

The vector Y which is optimized using Generalized Inverse Kinematics can have a high dimension, in order to properly represent all articulations of the robot. Thus, determining the whole trajectory of the robot by applying inverse dynamics on the whole vector Y would lead to a prohibitive computing cost. On the contrary, Generalized Inverse Kinematics has a much lower computing cost than inverse dynamics. Thus, computing the predicted trajectory of the mobile robot using inverse dynamics, on a dynamic model of the robot with a lower number of degrees of freedom, and computing the movements of articulated limbs using Generalized Inverse Kinematics with a larger number of degrees of freedom allows to properly calculate a trajectory of the mobile robot and movements of the articulated limbs at a reasonable computing cost.

In a number of embodiments of the invention, the processor is configured to perform all calculations of trajectories, velocities, etc. . . . with a single time step, over the same time window. For example, the processor can calculate the predicted movements of the articulated limbs 370 every 20 ms, and calculate each trajectory over a time horizon of 2 s, and using samples of 20 ms.

Once the predicted movements of the articulated limbs 370 are calculated, they can be read and used by motors and/or actuators in order to actually perform the movements of the robot.

The invention is not applicable only to the examples disclosed above. In particular, it is applicable not only to humanoid robot, but also to industrial robots which have a mobile base and articulated arms.

FIGS. 5a, 5b, 5c, 5d, 5e and 5f display respectively two views of a user interface to define the movements of a robot according to the invention, an example of trajectory of a robot in the prior art, positions of the robot and angular positions of an articulation of the robot in the prior art, an example of trajectory of a robot according to the invention, positions of the robot and angular positions of an articulation of the robot according to the invention.

Figure 5A:
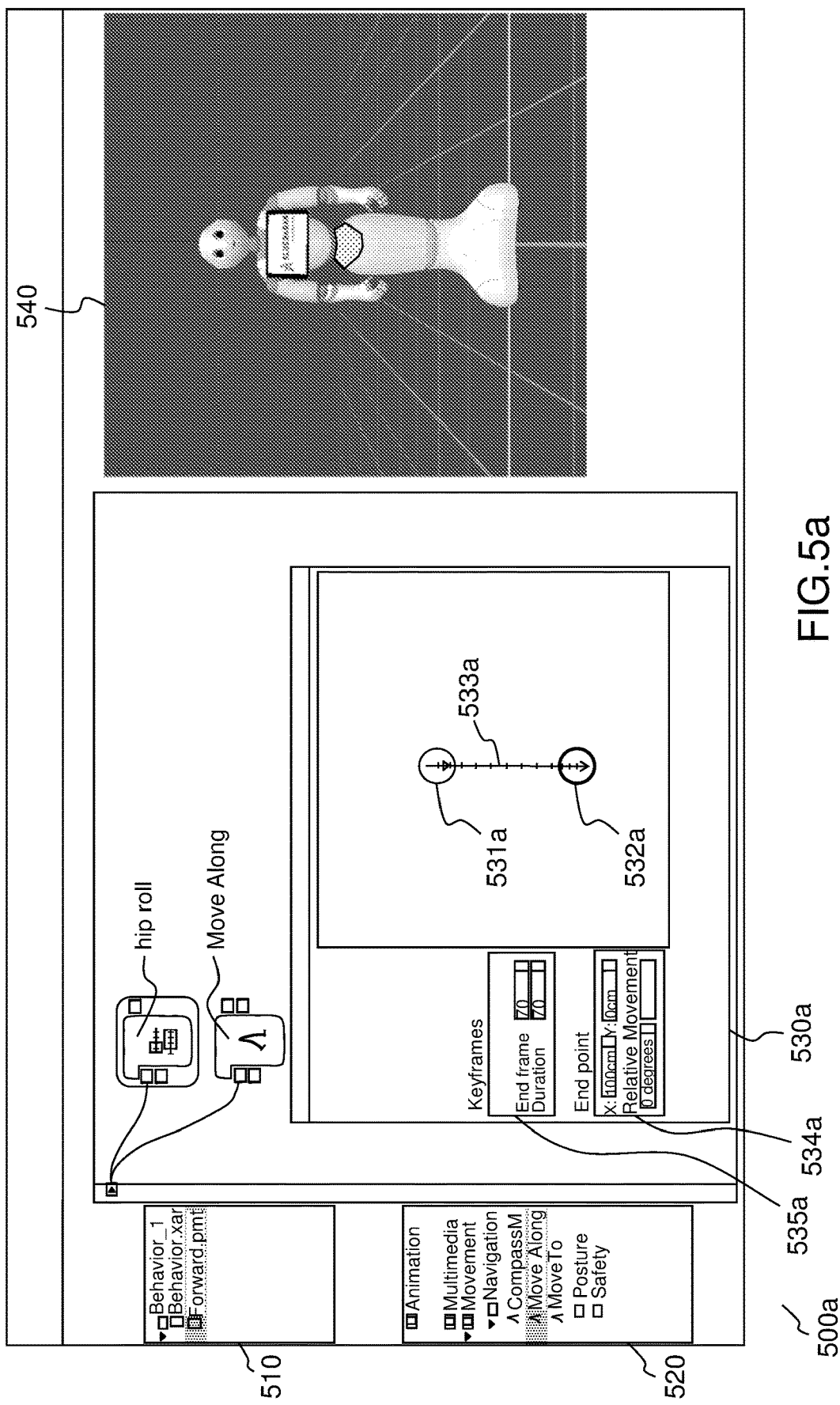
FIGS. 5*a*, 5*b*, 5*c*, 5*d*, 5*e* and 5*f* display respectively two views of an example of user interface to define the movements of a robot according to the invention, an example of trajectory of a robot in the prior art, positions of the robot and angular positions of an articulation of the robot in the prior art, an example of trajectory of a robot according to the invention, positions of the robot and angular positions of an articulation of the robot according to the invention.

FIG. 5a displays an example of a user interface to define the movements of a robot according to the invention. The interface comprises a window 500a which comprises a number of sub-windows.

The first sub-window 510 is used to create, select and edit behaviors. The second sub-window 520 is used to select types of movements to perform. In the example displayed in FIG. 5a, the movement is "move along", and defines a displacement of the robot on a trajectory.

A third sub-window 530a lets the user define the target trajectory of the robot. The user can notably define a start point 531a, and end point 532a, and an intermediary trajectory 533a. In this example, the trajectory defines a straight line between the starting point and the end point. The sub-window 534a is used to let the user define characteristics of the movement, notably the duration 535a.

The sub-window 540 offers a preview of the movements and postures of the robot.

Figure 5B:
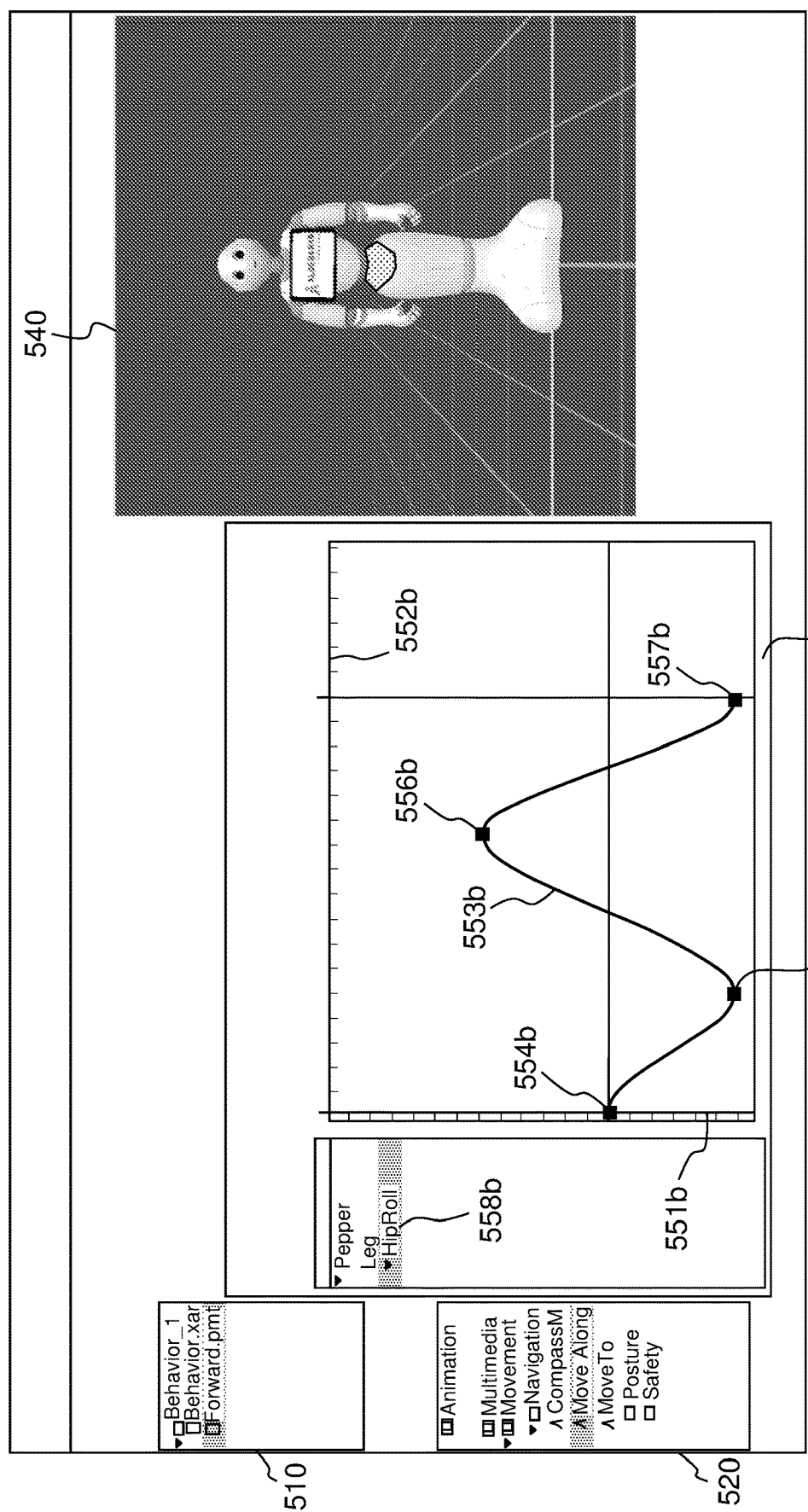

FIG. 5b displays a second view of the user interface to define the movements of a robot according to the invention. This second view defines a window 500b, which also has the sub-windows 510, 520 and 540.

The window 500b also comprises a sub-window 550b to define target movements of the articulations. The user can select pre-defined types of movements, for example a "HipRoll" movement 558b. In this example, the "HipRoll" movement corresponds to a left-and-right movement of the upper body of the robot around the hips of the robot.

The user can further define the characteristics of the movement of the robot. In the example of the "HipRoll" movement, the user can define the amplitude of the movement of the hips, defined on an axis of amplitudes 551b, relative to time, defined on a time axis 552b. The movement is defined by a (time, amplitude) spline 553b, which is in this example built based on reference points 554b, 555b, 556b and 557b.

The FIG. 5b displays an example of low-level command of the behavior of the robot. In other embodiments of the invention, it is possible to use higher-level commands, such as a posture to reach. For example, it is possible to use high level commands such as "reach out a position" or "place a hand at a given position/time". It is then possible to determine, based on such high-level commands, series of timed postures of the robot, which can be used to determine the trajectory of the CoM of the robot, and postures that the robot will reach.

Figure 5C:
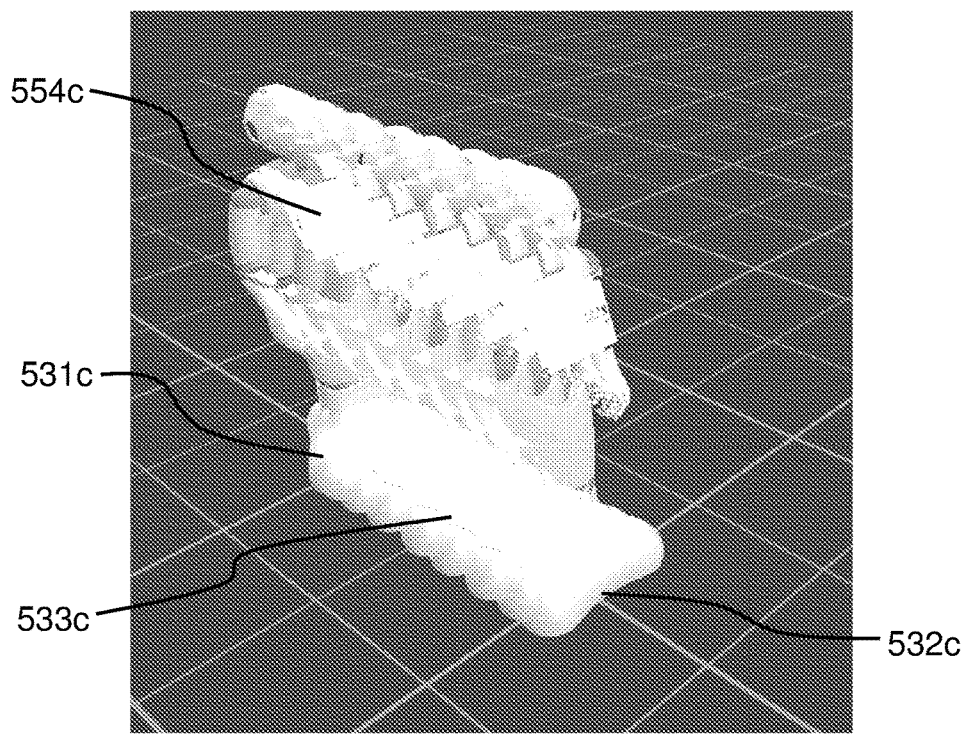

FIG. 5c displays an example of trajectory of a robot in the prior art.

More specifically, FIG. 5c displays the trajectory and behavior of the robot, as calculated in the prior art, based on the target trajectory defined in the window 500a, and the target movements of articulations defined in the window 500b.

In this example, the robot follows a trajectory and performs moves of articulated limbs, in order to follow as closely as possible the trajectory defined in window 500a and the behavior "HipRoll" 558b defined in window 500b. More specifically, the trajectory adopted by the robot and the position of the torso are as close as possible to the trajectory 533a, and the positions defined in 553b.

In the prior art, the robot thus follows a straight line trajectory 533c between a start point 531c and an end point 532c. Meanwhile, the robot performs movements of the torso, in order to adopt a behavior as close as possible to the behavior "HipRoll" 558b defined by the movements of articulations 553b. In the prior art, the robot is only able to perform the articulated movements 554c.

Figure 5D:
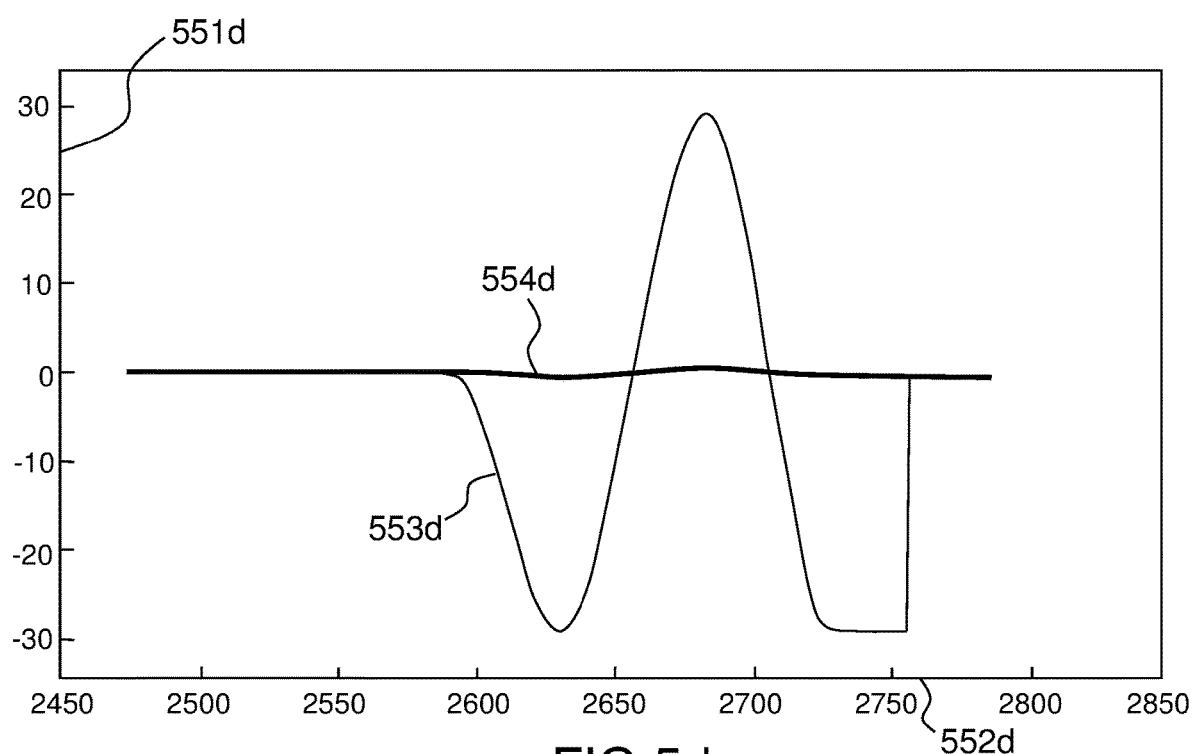

FIG. 5d displays an example of positions of the robot and angular positions of an articulation of the robot in the prior art.

FIG. 5d represents the amplitude of the movement of the upper body of the robot around the hips of the robot, represented on the axis 551d identical to the axis 551b, relative to an axis of time 552d. The curve 553d represents the objective of movement of articulations of the robot, and the curve 554d the actual movement of articulations of the robot.

As can be seen in FIGS. 5c and 5d, a robot of the prior art is not able to perform the movement planned in FIGS. 5a and 5b. The main reason is that, when calculating movements of the articulations follow the instructions defined by the spline 553b, the robot of the prior art will be limited by the kinematics constraints, notably the balance of the robot.

Figure 5E:
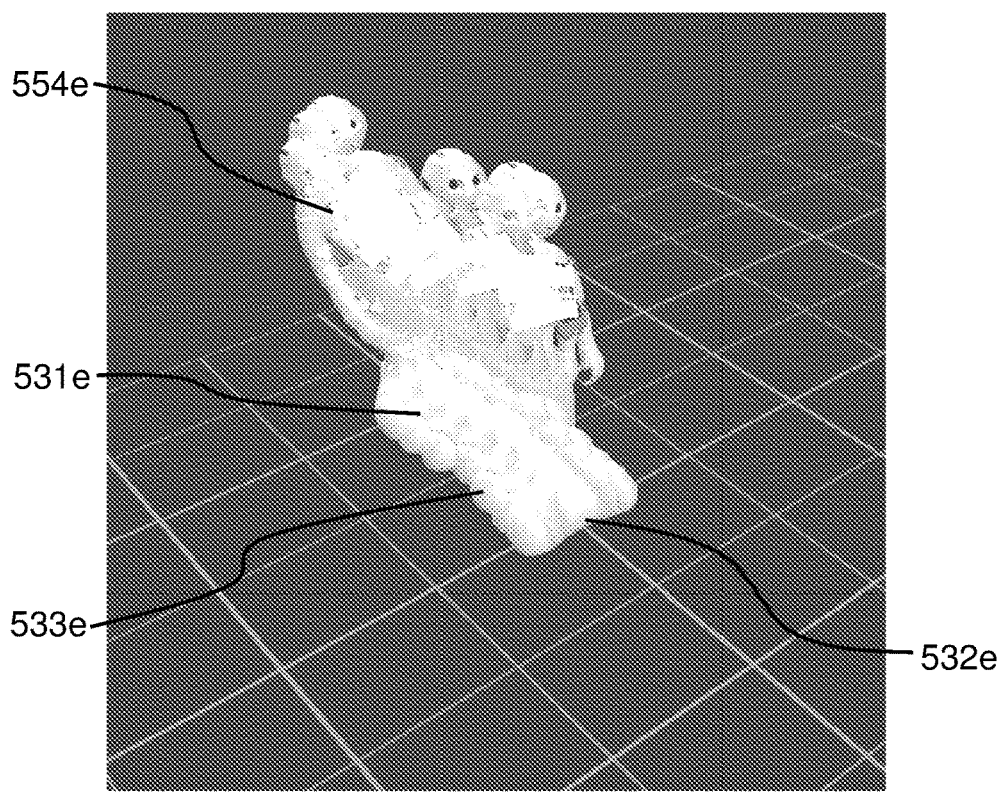

FIG. 5e displays an example of trajectory of a robot in an embodiment of the invention.

More specifically, FIG. 5e displays the trajectory and behavior of the robot, as calculated in the an embodiment of the invention, based on the target trajectory defined in the window 500a, and the target movements of articulations defined in the window 500b.

In this example, the robot follows a trajectory and performs moves of articulated limbs, in order to follow as closely as possible the trajectory defined in window 500a and the behavior "HipRoll" 558b defined in window 500b. More specifically, the trajectory adopted by the robot and the position of the torso are as close as possible to the trajectory 533a, and the positions defined in 553b.

In the prior art, the robot thus follows a trajectory 533e between a start point 531e and an end point 532e. Meanwhile, the robot performs movements of the torso, in order to adopt a behavior as close as possible to the behavior "HipRoll" 551b defined by the movements of articulations 553b. In the invention, the robot calculates a trajectory 533e which is not exactly a straight line, in order to take into account the effect of the movement of the torso to the position of the center of mass of the robot. This modification of the trajectory of the base of the robot allows the robot to perform movement of the torso 554e which is much more ample and closer to the movement planned by the user.

Figure 5F:
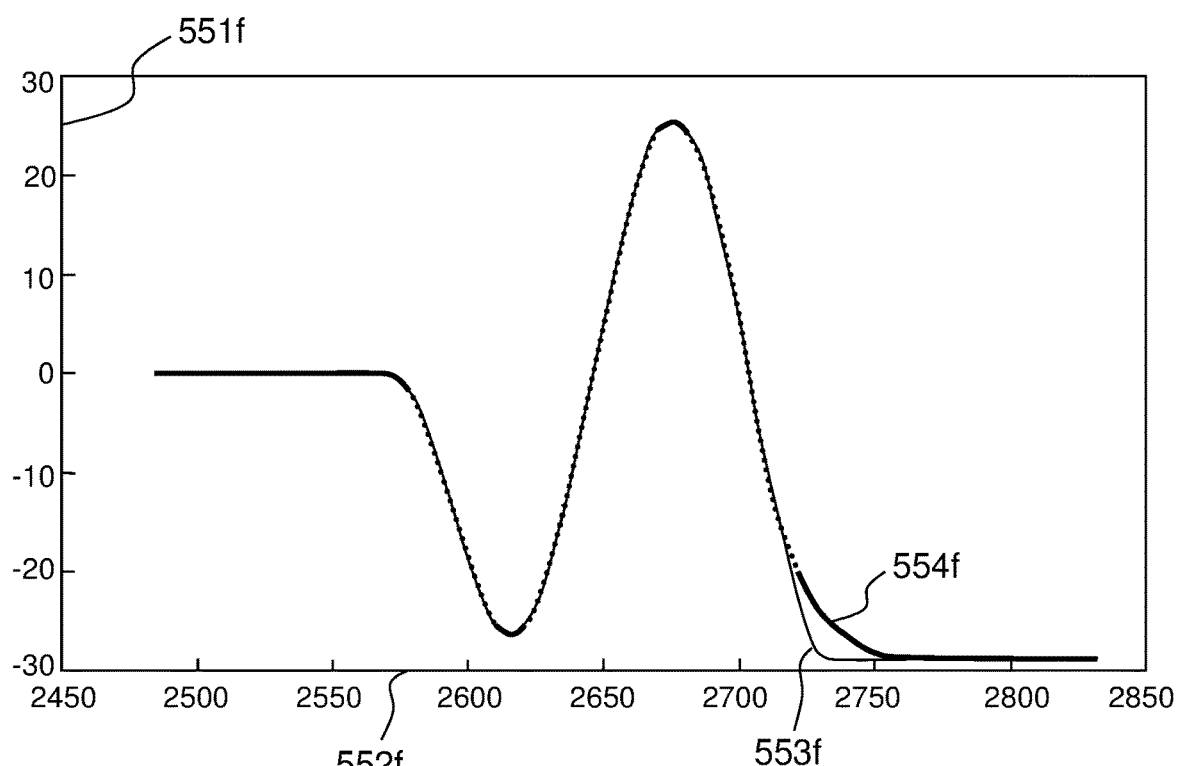

FIG. 5f displays an example of positions of the robot and angular positions of an articulation of the robot in an embodiment of the invention.

FIG. 5f represents the amplitude of the movement of the torso of the robot around its hips, represented on the axis 551f identical to the axis 551b, relative to an axis of time 552f. The curve 553f represents the objective of movement of articulations of the robot, and the curve 554f the actual movement of articulations of the robot, and corresponds to the movement displayed in FIG. 5e.

As can be seen in FIGS. 5e and 5f, a robot of the invention is able to perform a movement which is very close to the movement planned in FIGS. 5a and 5b. More specifically, the use of the movements of articulations to calculate to trajectory of the center of mass of the robot allows it to calculate movements of articulated limbs which are much closer to those planned by the user than the movements calculated in the prior art.

Figure 6A:
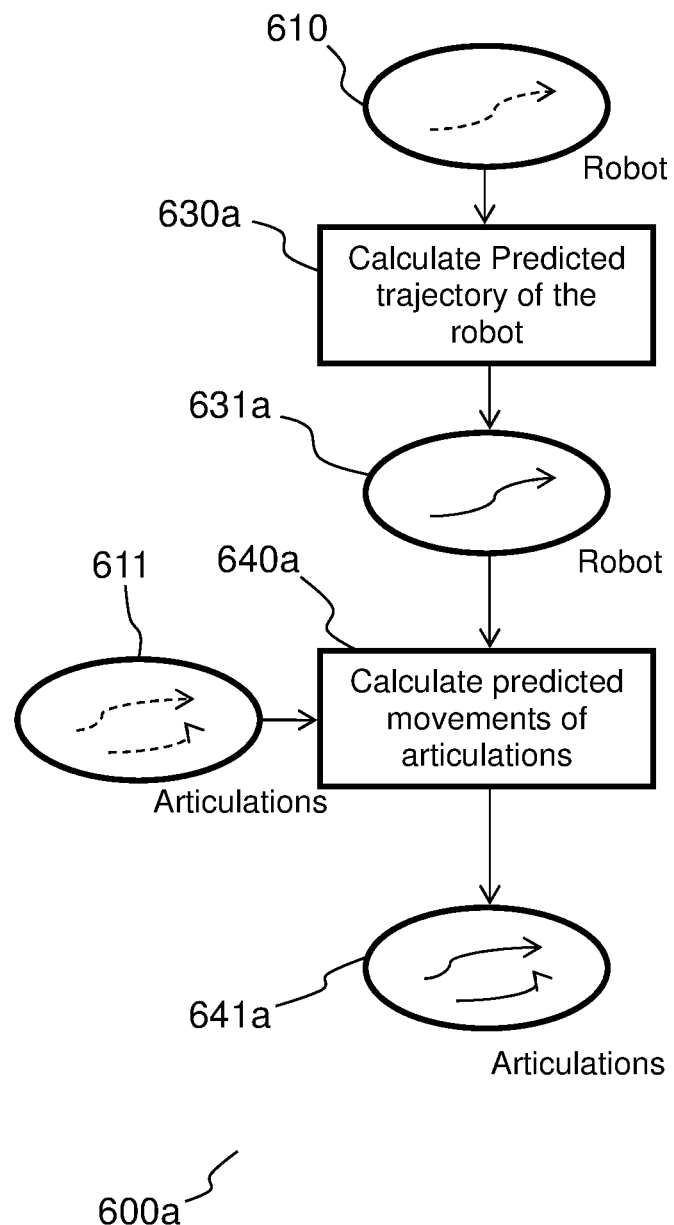
FIGS. 6*a* and 6*b* display respectively a method of the prior art and a method in an embodiment of the invention.
Figure 6B:
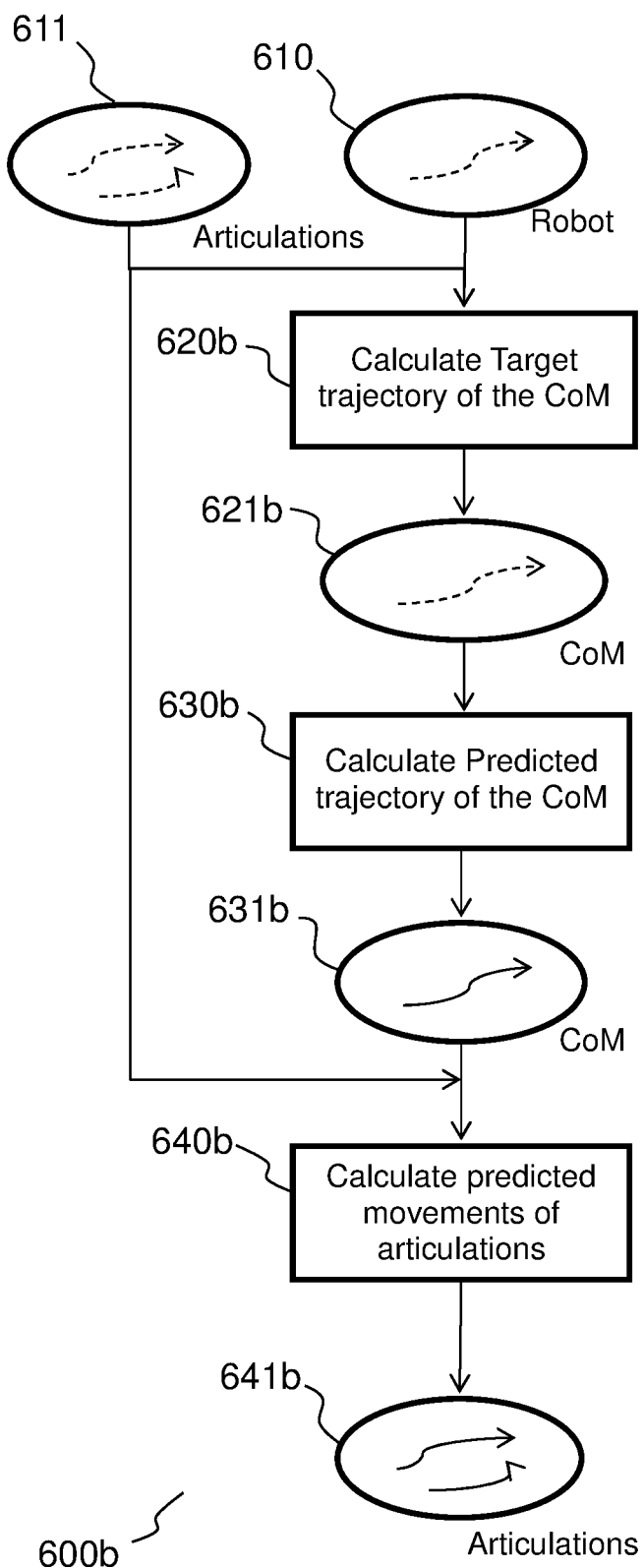

FIGS. 6a and 6b display respectively a method of the prior art and a method in an embodiment of the invention.

FIG. 6a displays a method 600a to calculate predicted movements of a mobile robot having a plurality of articulated limbs in the prior art.

The method 600a comprises a step of receiving as input 610, 611 instructions defining a motion of the mobile robot and instructions defining a behavior of the mobile robot.

The method 600a further comprises a step of calculating 630a, based on the instructions 611 defining a motion of the mobile robot, a predicted trajectory 631a of the mobile robot over a time horizon. This trajectory can be for example a trajectory of a center of mass of the mobile robot, based on a standard posture, not on actual movements of the articulations.

The method 600a further comprises a step of calculating 640a, based on the predicted trajectory 631a of the mobile robot and the instructions defining a behavior of the mobile robot 611, predicted movements 641a of articulated limbs.

The method 600a thus allows calculating both a trajectory and predicted movements of articulations of a robot. However, the dynamic constraints of the robot may limit the possibilities of calculating movements of the articulations at step 640a, as disclosed in FIGS. 5c and 5d.

FIG. 6b displays a method 600b to calculate predicted movements of a mobile robot having a plurality of articulated limbs in an embodiment of the invention.

The method 600b comprises a step of receiving as input 610, 611 instructions defining a motion of the mobile robot and instructions defining a behavior of the mobile robot.

The method 600b further comprises a step of calculating 620b a target trajectory of the center of mass of the mobile robot 621b based on the input 610, 611.

The method 600b further comprises a step of calculating 630b, based on the target trajectory 621b of the center of mass of the mobile robot and dynamic constraints of the mobile robot, a predicted trajectory 631b of the center of mass of the mobile robot over a time horizon.

The method 600b further comprises a step of calculating 640b, based on the predicted trajectory 631b of the center of mass of the mobile robot and the instructions defining a behavior of the mobile robot 611, predicted movements 641b of articulated limbs.

The method 600b of the invention, by taking into account the movements of articulated limbs in order to calculate the predicted trajectory of the center of mass of the robot allows overcoming the limitations of the prior art method. More specifically, it allows the robot to adopt a behavior, and execute movements of the articulated limbs, which is much closer to the instructions 611 defining the behavior of the mobile robot than the method of the prior art.

The method 600b can be implemented in many ways. For example, it can be implemented in a software architecture such as the architecture 300. It can be executed by a processor onboard a robot of the invention. It can also be implemented in an editor of movements of the robot, such as the user interface displayed in FIGS. 5a and 5b. It can thus be used to obtain a preview of the movements of the robot. When the robot is not able to adopt a behavior, even using the method of the invention, the user can modify the behavior of the robot in order to define a behavior that the robot will be able to perform.

The examples described above are given as illustrations of embodiments of the invention. They do not in any way limit the scope of the invention which is defined by the following claims.

The invention claimed is:

1. A mobile robot having:
   a plurality of articulated limbs;
   a processor configured to:
      receive as input instructions defining a motion of the mobile robot and instructions defining a behavior of the mobile robot; calculate a target trajectory of a center of mass of the mobile robot based on the input;
      calculate, based on the target trajectory of the center of mass of the mobile robot and dynamic constraints of the mobile robot, a predicted trajectory of the center of mass of the mobile robot over a time horizon; and
      calculate, based on the predicted trajectory of the center of mass of the mobile robot and the instructions defining a behavior of the mobile robot, predicted movements of articulated limbs,
   wherein the processor is configured to calculate the predicted trajectory of the center of mass of the mobile robot using a dynamic model of the mobile robot by:
      modeling the mobile robot as a double inverted pendulum comprising two masses which are respectively a center of mass of a base of the mobile robot and a center of mass of an upper body of the robot,
      formulating constraints that the Zero Moment Point of the mobile robot never leaves a polygon having a position defined relative to the base of the mobile robot, and the base of the mobile robot has a maximum acceleration and speed, and
      solving the problem of control of the double inverted pendulum, in order to minimize a function of cost, said function of cost being based on at least one of differences of positions of the center of mass of the mobile robot in the target trajectory and positions of the center of mass of the mobile robot in the predicted trajectory, and speeds of the center of mass of the mobile robot in the target trajectory and speeds of the center of mass of the mobile robot in the predicted trajectory.

2. The mobile robot of claim 1, wherein the processor is configured to calculate the target trajectory of the center of mass of the mobile robot by calculating, at successive time steps:
   positions of centers of mass of the articulated limbs of the mobile robot;
   positions of the center of mass of the mobile robot, based on a target position of the mobile robot, the masses and the positions of the centers of mass of the articulated limbs of the mobile robot.

3. The mobile robot of claim 1, wherein the processor is configured to calculate predicted movements of articulated limbs with respect to dynamic constraints of the mobile robot in order to minimize a function of cost.

4. The mobile robot of claim 3, wherein the function of cost is a weighted average, at successive time steps, of at least two of a distance between predicted positions of the center of mass of the mobile robot, differences between target speeds of articulated limbs and predicted speeds of articulated limbs and distances between target positions of articulated limbs and predicted positions of articulated limbs.

5. The mobile robot of claim 3, wherein the processor is configured to calculate predicted movements of articulated limbs under the constraints limits of joint angles, joint velocity and joint accelerations.

6. The mobile robot of claim 1, wherein the instructions defining a behavior of the mobile robot are defined by at least one timed posture to reach, and the processor is further configured to convert said at least one timed posture of the mobile robot into target trajectories of articulated limbs relative to the mobile robot.

7. The mobile robot of claim 1, wherein the predicted trajectory of the center of mass of the mobile robot is defined by values of predicted positions and speeds of the center of mass of the mobile robot at successive time steps over a time window.

8. The mobile robot of claim 7, wherein the predicted movements of articulated limbs are defined by values of one or more of angles between articulated limbs, and angular velocities between articulated limbs at said successive time steps, said values of one or more of angles between articulated limbs, and angular velocities between articulated limbs at said successive time steps to be converted into setpoint command of motors.

9. The mobile robot of claim 1, wherein the instructions defining a motion of the mobile robot, and the instructions defining the behavior of the mobile robot are defined by a user on the user interface.

10. The mobile robot of claim 1, wherein the instructions defining a motion of the mobile robot correspond to a predefined trajectory, and the processor is configured to calculate instructions defining the behavior of the mobile robot upon the occurrence of an unexpected event.

11. A user interface to define motions and behaviors of a mobile robot having a plurality of articulated limbs, said user interface comprising computer code instructions to:

let the user define as input instructions defining a motion of the mobile robot and instructions defining a behavior of the mobile robot;

calculate a target trajectory of the center of mass of the mobile robot based on the input;

calculate, based on the target trajectory of the center of mass of the mobile robot and dynamic constraints of the mobile robot, a predicted trajectory of the center of mass of the mobile robot over a time horizon;

calculate, based on the predicted trajectory of the center of mass of the mobile robot and the instructions defining a behavior of the mobile robot, predicted movements of articulated limbs, wherein said user interface comprises computer code instructions to calculate the predicted trajectory of the center of mass of the mobile robot using a dynamic model of the mobile robot by:

modeling the mobile robot as a double inverted pendulum comprising two masses which are respectively a center of mass of a base of the mobile robot and a center of mass of an upper body of the robot, formulating constraints that the Zero Moment Point of the mobile robot never leaves a polygon having a position defined relative to the base of the mobile robot, and the base of the mobile robot has a maximum acceleration and speed, and solving the problem of control of the double inverted pendulum, in order to minimize a function of cost, said function of cost being based on at least one of differences of positions of the center of mass of the mobile robot in the target trajectory and positions of the center of mass of the mobile robot in the predicted trajectory, and speeds of the center of mass of the mobile robot in the target trajectory and speeds of the center of mass of the mobile robot in the predicted trajectory.

12. A method to calculate predicted movements of a mobile robot having a plurality of articulated limbs, said method comprising:

receiving as input instructions defining a motion of the mobile robot and instructions defining a behavior of the mobile robot;

calculating a target trajectory of the center of mass of the mobile robot based on the input; calculating, based on the target trajectory of the center of mass of the mobile robot and dynamic constraints of the mobile robot, a predicted trajectory of the center of mass of the mobile robot over a time horizon;

calculating, based on the predicted trajectory of the center of mass of the mobile robot and the instructions defining a behavior of the mobile robot, predicted movements of articulated limbs, wherein the method comprises calculating the predicted trajectory of the center of mass of the mobile robot using a dynamic model of the mobile robot by:

modeling the mobile robot as a double inverted pendulum comprising two masses which are respectively a center of mass of a base of the mobile robot and a center of mass of an upper body of the robot, formulating constraints that the Zero Moment Point of the mobile robot never leaves a polygon having a position defined relative to the base of the mobile robot, and the base of the mobile robot has a maximum acceleration and speed, and solving the problem of control of the double inverted pendulum, in order to minimize a function of cost, said function of cost being based on at least one of differences of positions of the center of mass of the mobile robot in the target trajectory and positions of the center of mass of the mobile robot in the predicted trajectory, and speeds of the center of mass of the mobile robot in the target trajectory and speeds of the center of mass of the mobile robot in the predicted trajectory.

* * * * *